US012699611B2

(12) United States Patent
Pang et al.

(10) Patent No.: US 12,699,611 B2
(45) Date of Patent: Aug. 4, 2026

(54) STATISTICS AND FEEDBACK-BASED SCAN FRAMEWORK FOR CLUSTER NODES

(71) Applicant: Dell Products, L.P., Hopkinton, MA (US)

(72) Inventors: Lixin Pang, Needham, MA (US); Rong Yu, West Roxbury, MA (US)

(73) Assignee: Dell Products, L.P., Hopkinton, MA (US)

( * ) Notice: Subject to any disclaimer, the term of this patent is extended or adjusted under 35 U.S.C. 154(b) by 332 days.

(21) Appl. No.: 18/655,410

(22) Filed: May 6, 2024

(65) Prior Publication Data

US 2025/0342051 A1     Nov. 6, 2025

(51) Int. Cl.
*G06F 11/07* (2006.01)
*G06F 9/48* (2006.01)
*G06F 9/50* (2006.01)

(52) U.S. Cl.
CPC ........ *G06F 11/0709* (2013.01); *G06F 9/4843* (2013.01); *G06F 9/4881* (2013.01); *G06F 9/5038* (2013.01); *G06F 11/079* (2013.01)

(58) Field of Classification Search
CPC .. G06F 11/0709; G06F 9/4843; G06F 9/4881; G06F 9/5038; G06F 11/079
See application file for complete search history.

(56) References Cited

U.S. PATENT DOCUMENTS

| | | | |
|---|---|---|---|
| 10,173,320 B1 * | 1/2019 | Prisament | B25J 9/1664 |
| 10,318,346 B1 * | 6/2019 | Harizopoulos | G06F 3/0626 |
| 11,741,252 B1 * | 8/2023 | Yewchin | G06F 21/565 |
| | | | 726/26 |
| 12,483,576 B1 * | 11/2025 | Guo | G06F 16/9024 |
| 2016/0011925 A1 * | 1/2016 | Kulkarni | G06F 11/3006 |
| | | | 714/57 |
| 2020/0034534 A1 * | 1/2020 | Toley | G06F 16/182 |
| 2023/0135645 A1 * | 5/2023 | Guim Bernat | G06F 11/0709 |
| | | | 718/105 |
| 2023/0367703 A1 * | 11/2023 | Liu | G06F 11/368 |
| 2024/0220402 A1 * | 7/2024 | Chen | G06F 11/3688 |
| 2025/0217032 A1 * | 7/2025 | Zheng | G06F 3/0673 |
| 2025/0317490 A1 * | 10/2025 | Adivi | H04L 67/1097 |
| 2025/0335280 A1 * | 10/2025 | Zhang | G06F 11/0751 |
| 2026/0023609 A1 * | 1/2026 | Mccollum | G06F 9/4881 |
| 2026/0089081 A1 * | 3/2026 | Mccollum | H04L 43/50 |

* cited by examiner

*Primary Examiner* — Benjamin C Wu

(74) *Attorney, Agent, or Firm* — Anderson Gorecki LLP

(57)     ABSTRACT

A statistics and feedback-based diagnostic scan framework for cluster nodes is provided, that prioritizes work items for processing by cluster nodes according to work item priority. A heatmap of work items is created and used by the diagnostic scan framework to prioritize work items for processing by the cluster nodes. The heatmap may be created from runtime IO operations, metadata access/updates, or other metrics derived from systems executing within the storage system. Additionally, as cluster nodes process allocated work items, the results of the scan operations are used to update the heat map to adjust the heat map based on the results of the previous scan operations. The heat map may prioritize individual work items or may create regions of work items and prioritize processing of work items according work item region.

20 Claims, 6 Drawing Sheets

FIG. 4

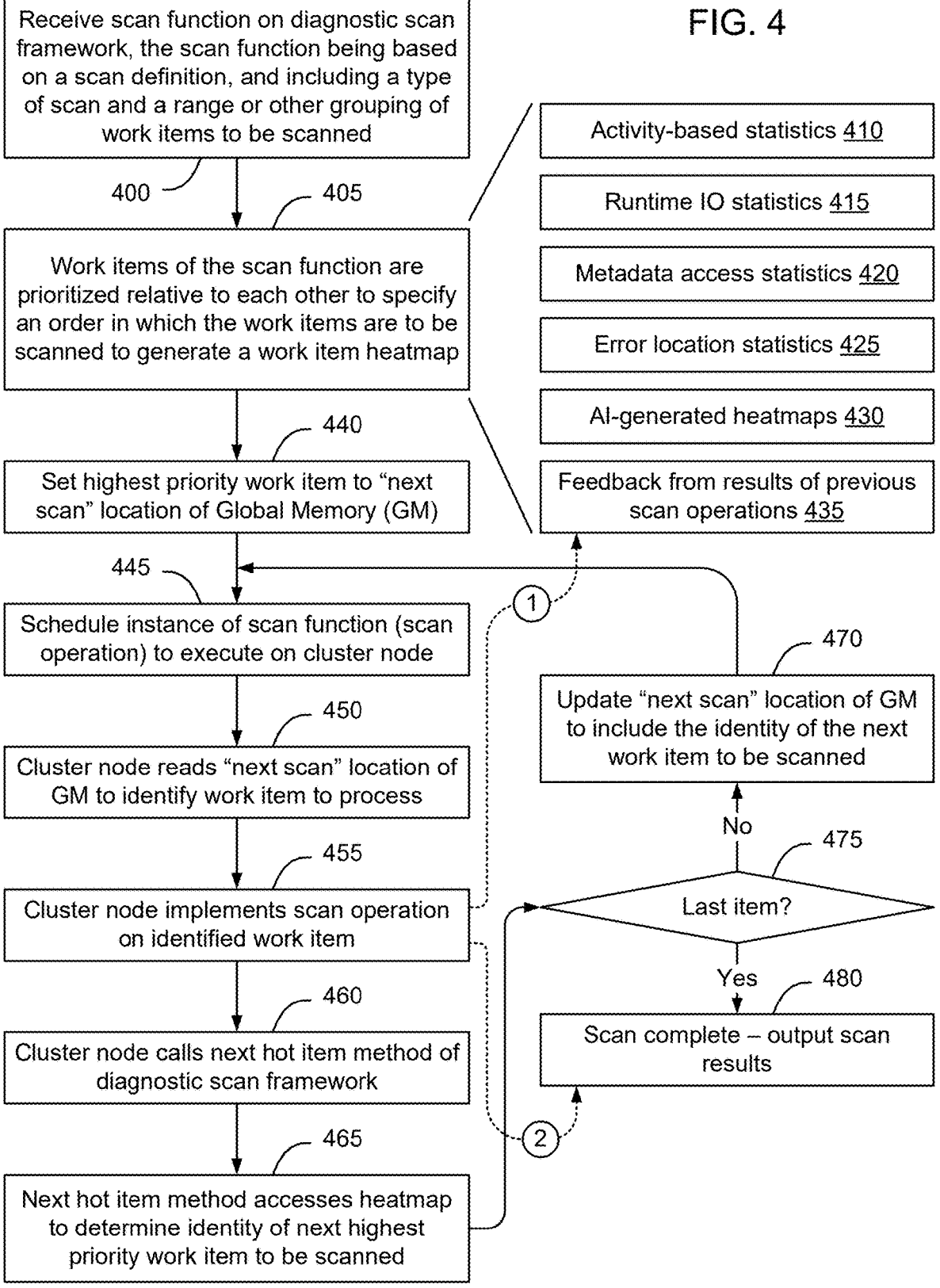

Receive scan function on diagnostic scan framework, the scan function being based on a scan definition, and including a type of scan and a range or other grouping of work items to be scanned

400

405

Activity-based statistics 410

Runtime IO statistics 415

Metadata access statistics 420

Error location statistics 425

AI-generated heatmaps 430

Feedback from results of previous scan operations 435

Work items of the scan function are prioritized relative to each other to specify an order in which the work items are to be scanned to generate a work item heatmap

440

Set highest priority work item to "next scan" location of Global Memory (GM)

445

Schedule instance of scan function (scan operation) to execute on cluster node

1

470

Update "next scan" location of GM to include the identity of the next work item to be scanned

450

Cluster node reads "next scan" location of GM to identify work item to process

455

Cluster node implements scan operation on identified work item

No

475

Last item?

Yes

480

460

Cluster node calls next hot item method of diagnostic scan framework

465

2

Scan complete – output scan results

Next hot item method accesses heatmap to determine identity of next highest priority work item to be scanned

FIG. 6

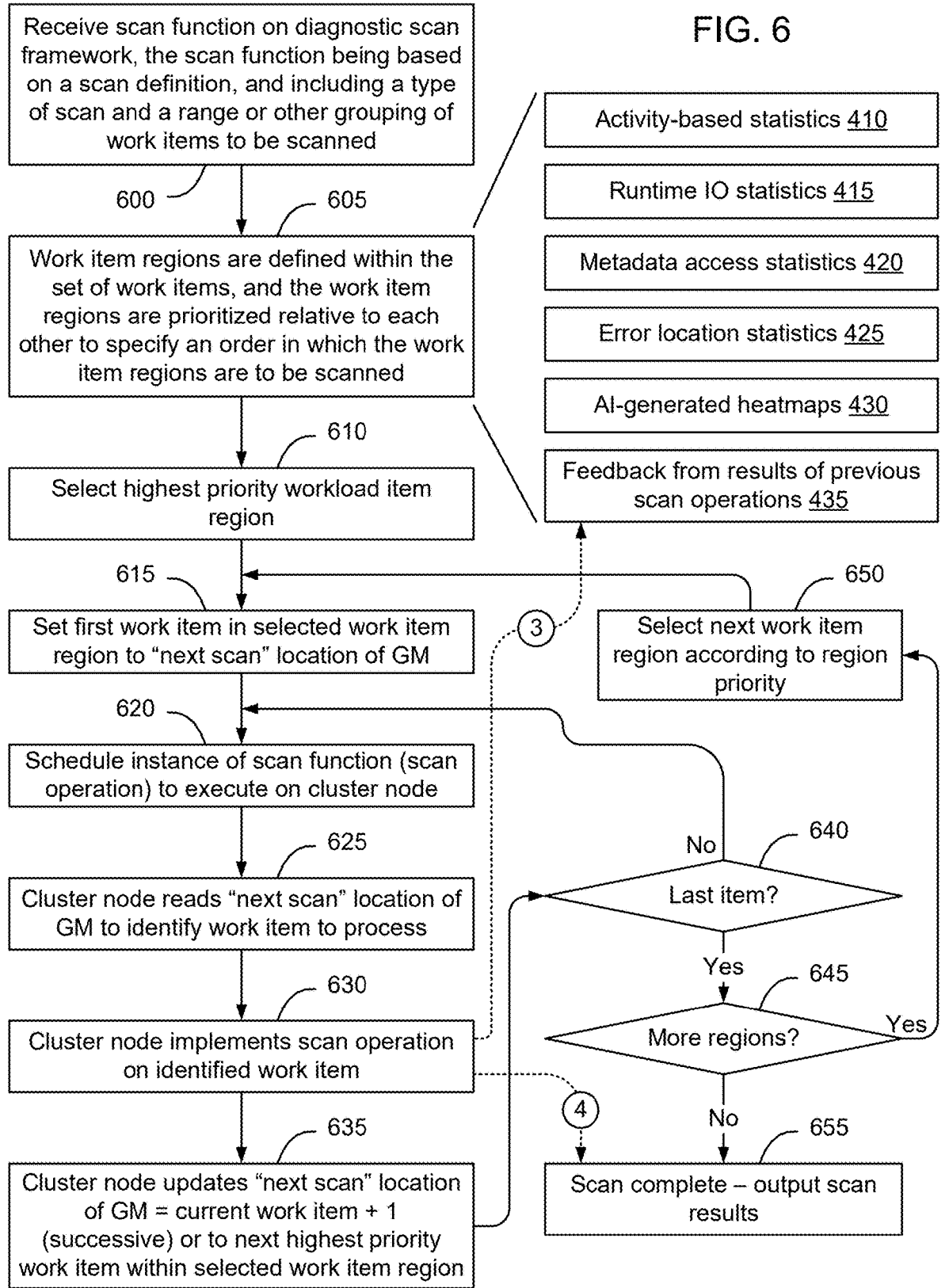

Receive scan function on diagnostic scan framework, the scan function being based on a scan definition, and including a type of scan and a range or other grouping of work items to be scanned

600

605

Activity-based statistics 410

Runtime IO statistics 415

Metadata access statistics 420

Error location statistics 425

AI-generated heatmaps 430

Feedback from results of previous scan operations 435

Work item regions are defined within the set of work items, and the work item regions are prioritized relative to each other to specify an order in which the work item regions are to be scanned

610

Select highest priority workload item region

615

Set first work item in selected work item region to "next scan" location of GM

3

650

Select next work item region according to region priority

620

Schedule instance of scan function (scan operation) to execute on cluster node

625

Cluster node reads "next scan" location of GM to identify work item to process

630

Cluster node implements scan operation on identified work item

635

Cluster node updates "next scan" location of GM = current work item + 1 (successive) or to next highest priority work item within selected work item region

640

No

Last item?

Yes

645

More regions?

Yes

4

No

655

Scan complete – output scan results

STATISTICS AND FEEDBACK-BASED SCAN FRAMEWORK FOR CLUSTER NODES

FIELD

This disclosure relates to computing systems and related devices and methods, and, more particularly, to a method and apparatus for statistics and feedback-based scan framework for cluster nodes.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

In some embodiments, a method and apparatus for statistics and feedback-based scan framework for cluster nodes is provided. According to some embodiments, a statistics and feedback-based scan framework for cluster nodes is provided, that prioritizes work items for processing by cluster nodes according to work item priority. In some embodiments, a heatmap of work items is created and used by the scan framework to prioritize work items for processing by the cluster nodes. The heatmap may be created from runtime IO operations, metadata access/updates, or other metrics derived from systems executing within the storage system. Additionally, as cluster nodes process allocated work items, the results of the scan operations are used as feedback to update the heat map to adjust the heat map based on the results of the previous scan operations. For example, in response to a determination by a cluster node that the scan operation on the work item resulted in no discernable error, the heatmap may be adjusted to lower the priority of work items in the vicinity of the work item that was scanned by the cluster node. By contrast, in response to a determination by a cluster node that the scan operation on the work item resulted in correction of one or more errors, the heatmap may be adjusted to increase the priority of work items in the vicinity of the work item that was scanned by the cluster node.

In some embodiments, a method of prioritizing processing of work items by cluster nodes to implement a scan function on a diagnostic scan framework, includes receiving a scan function, the scan function identifying a type of scan to be implemented on the diagnostic scan framework and a range of work items to be scanned, prioritizing each of the work items of the range of work items relative to each other to form a prioritized ranking of work items, and processing the work items of the scan function according to the prioritized ranking of the work items. In some embodiments, processing each work item includes assigning a scan operation to be executed on a respective cluster node, identifying, by the respective cluster node from the diagnostic scan framework, a highest priority work item of the scan function that has not yet been processed by another cluster node, implementing a scan process on the identified highest priority work item by the respective cluster node, and updating the diagnostic scan framework to identify a next highest priority work item to be processed by a subsequent cluster node.

In some embodiments, processing the work items of the scan function according to the prioritized ranking of work items includes individually selecting each of the work items of the scan function to be scanned by cluster nodes based on work item priority.

In some embodiments, processing the work items of the scan function according to the prioritized ranking of work items includes grouping sets of work items into work item regions, prioritizing each of the work item regions of the range of work items relative to each other to form a prioritized ranking of work item regions, and processing work items according to the prioritization of the work item regions.

In some embodiments, processing work items according to the prioritization of the work item regions includes selecting a highest priority work item region, processing all work items of the selected highest priority work item region, selecting a next highest priority work item region, processing all work items of the selected next highest priority work item region, and iterating the steps of selecting the next highest priority work item region and processing all work items of the selected next highest priority work item region until all work items of all work item regions have been processed.

In some embodiments, processing work items of a selected work item region includes sequentially selecting each of the work items of the selected work item region to be scanned by cluster nodes.

In some embodiments, processing all work items of a selected work item region includes selecting each of the work items of the selected work item region to be scanned by cluster nodes based on relative priorities of the work items of the selected work item region from highest priority to lowest priority.

In some embodiments, prioritizing each of the work items of the range of work items relative to each other to form a prioritized ranking of work items includes creating a workload item heatmap.

In some embodiments, implementing a scan process on the identified highest priority work item by the respective cluster node includes determining whether work item contained an error.

In some embodiments, in response to a determination by the respective cluster node that the scan process on the work item resulted in no discernable error, the method further includes adjusting the prioritized ranking of work items to lower a priority of work items adjacent the work item that was scanned by the respective cluster node.

In some embodiments, in response to a determination by the respective cluster node that the scan process on the work item resulted in correction of one or more errors, the method further includes adjusting the prioritized ranking of work items to increase a priority of work items adjacent the work item that was scanned by the respective cluster node.

US 12,699,611 B2

3 selected to be scanned by cluster nodes based on work item priority, according to some embodiments.

Figure 2:
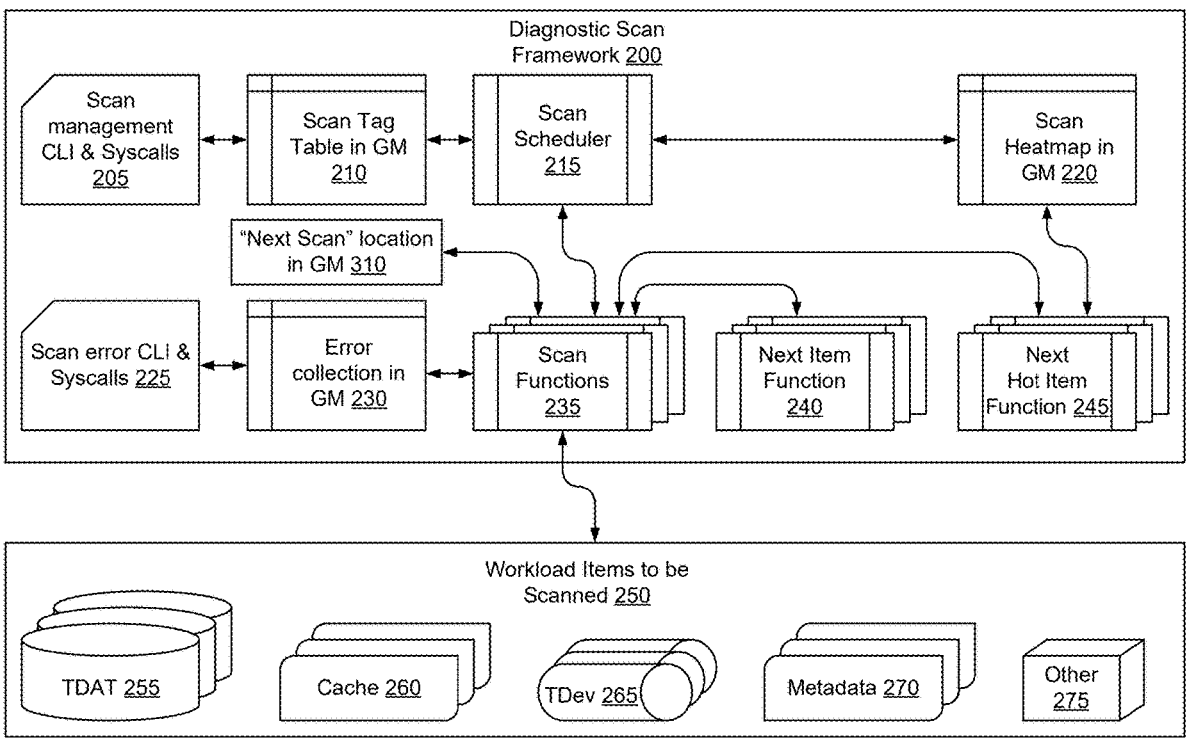
FIG. 2 is a block diagram of an example diagnostic scan framework implementing a statistics and feedback-based scan framework for cluster nodes, according to some embodiments.

FIG. 4 is a flow chart of an example method of using the diagnostic scan framework of FIG. 2 to implement a diagnostic scan using a statistics and feedback-based prioritization of work items, in which work items are individually selected to be scanned by the cluster nodes based on work item priority, according to some embodiments.

Figure 5:
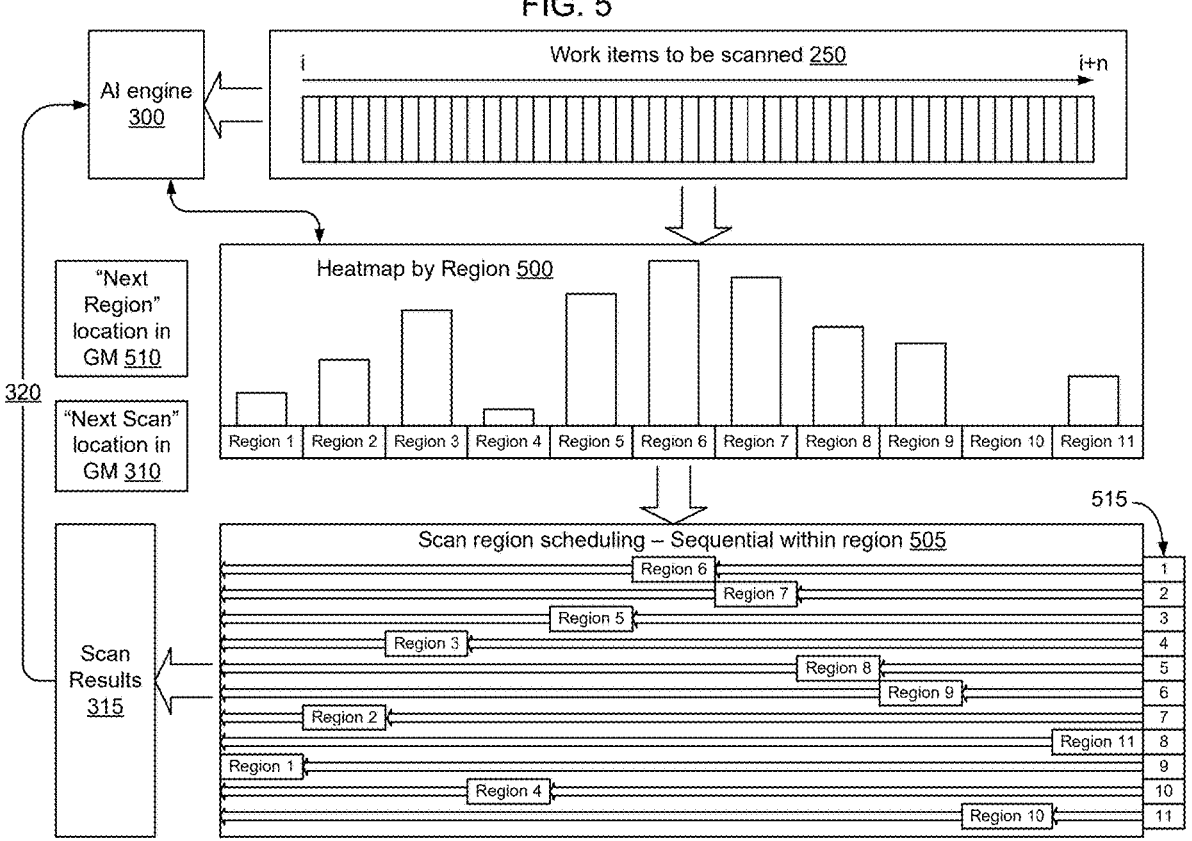

FIG. 5 is a block diagram of an example method of using the diagnostic scan framework of FIG. 2 to implement a diagnostic scan using a statistics and feedback-based prioritization of work items, in which work items are grouped into work item regions, and in which the work items regions are selected to be scanned according to region priority, according to some embodiments.

FIG. 6 is a flow chart of an example method of using the diagnostic scan framework of FIG. 2 to implement a diagnostic scan using a statistics and feedback-based prioritization of work items, in which work items are grouped into work item regions, and in which the work items regions are selected to be scanned according to region priority, according to some embodiments.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
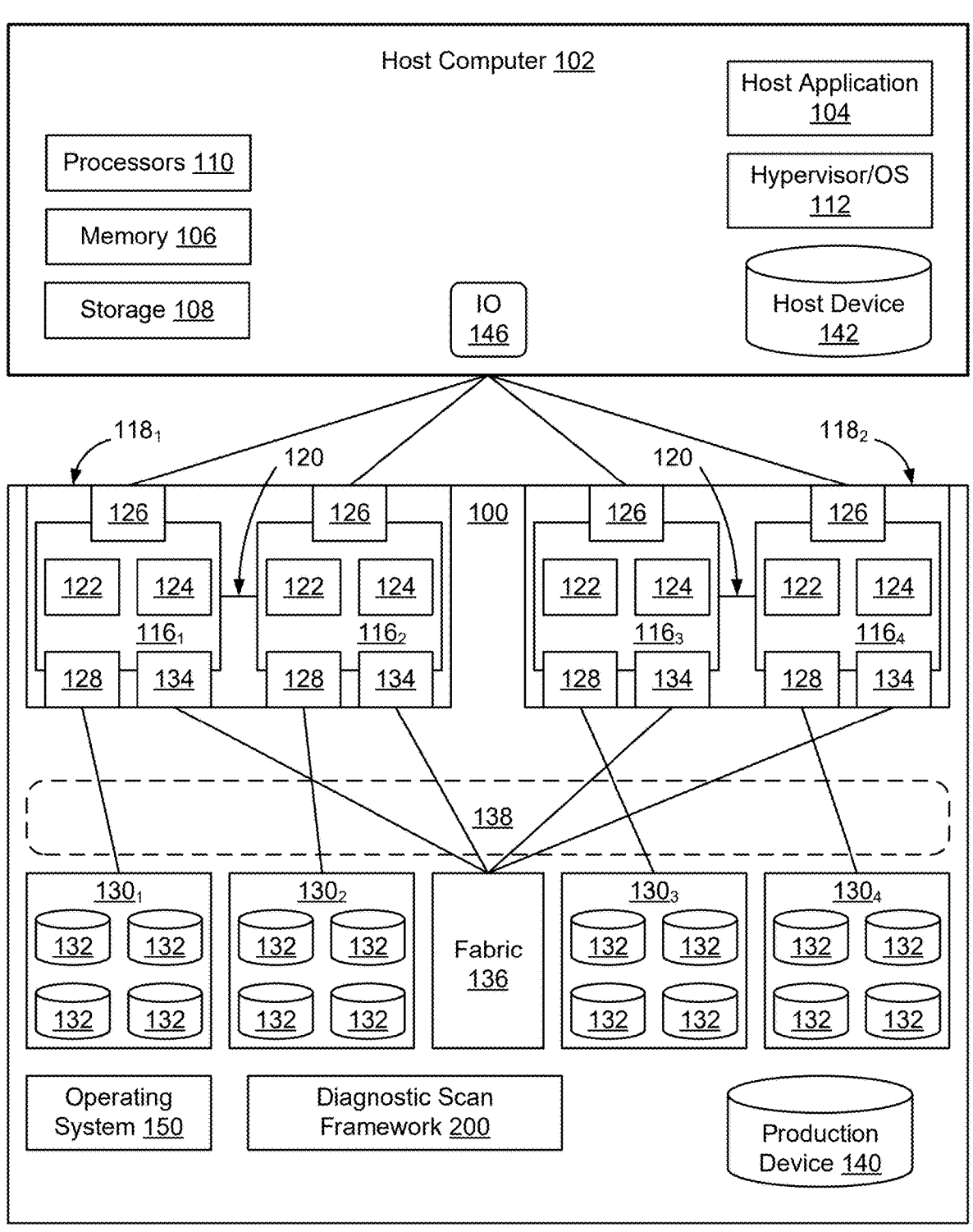
FIG. 1 is a functional block diagram of a host computer connected to an example storage system having a diagnostic scan framework, according to some embodiments.

FIG. 1 is a functional block diagram of a host computer connected to an example storage system, according to some embodiments. FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. In some embodiments, the communication links 120 are implemented as a PCIe NTB. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g., including multiple CPUs, GPUs, and combinations thereof. The local volatile memory 124 may include, for example and without limitation, any type of RAM. Each compute node 116 may also include one or more front-end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using PCIe (Peripheral Component Interconnect Express) or InfiniBand. Each compute node 116 may allocate a portion or partition of its respective local volatile memory 124 to a virtual shared memory 138 that can be accessed by other compute nodes 116 over the PCIe NTB links.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

In the case where IO 146 is a read command, the storage system 100 uses metadata to locate the commanded data, e.g., in the virtual shared memory 138 or on managed drives 132. If the commanded data is not in the virtual shared memory 138, then the data is temporarily copied into the virtual shared memory 138 from the managed drives 132 and sent to the host application 104 by the front-end adapter 126 of one of the compute nodes $116_1$-$116_4$. In the case where the IO 146 is a write command, in some embodiments the storage system 100 copies a block being written into the virtual shared memory 138, marks the data as dirty, and creates new metadata that maps the address of the data on the production device 140 to a location to which the block is written on the managed drives 132.

As is clear from the above description of FIG. 1, storage systems are complicated computer systems that are relied upon by customers to maintain data. The compute nodes $116_1$-$116_4$ rely on data integrity of in-cache user data, metadata, user data on disk, and the consistency of all of these forms of data. In addition, runtime data structure consistency between compute nodes is also important for run-time input/output IO operations. It is unavoidable that errors may occur, due to both software and hardware issues. When a failure or inconsistency in data is identified, it is often necessary to implement one or more types of scans to determine the breadth of the error and to identify items that need to be corrected. In some embodiments, a "scan framework" is used to manage various types of scans operations to enable scans to be defined and executed to monitor and handle system error conditions for each of the key layers and components of the storage system 100.

A "scan framework", as that term is used herein, refers to a platform that provides a foundation for enabling scan definitions to be implemented as scan functions on the storage system. Multiple types of scan definitions can be developed, for example to enable different types of scans implemented as different types of scan functions to execute on the storage system. Example types of scan definitions may be defined, for example, to enable work items such as slots of global memory, metadata pages, etc., to be scanned.

Scan functions based on the scan definitions are submitted to the scan framework to be implemented by the scan framework. When a scan function is submitted to the scan framework, the scan framework schedules instances of the scan function (scan operations) to cluster nodes for processing. In the context of a storage system, a cluster node may be implemented, for example, by compute node 116. The scan operation on the cluster node then selects and scans a work item from the scan function. In some embodiments, the scan framework is configured to enable hundreds of scan functions to be implemented at the same time on the cluster nodes of the storage system. Because scan operations on work items are generally able to be implemented independently, it is often possible for the scan framework to schedule multiple scan operations of a given scan function to cluster nodes in parallel.

Example scan functions might include scanning slots of shared global memory 138, scanning front-end track IDs, back-end track IDs, scanning the storage system virtual provisioning interface, performing scans of data stored on disks 132, local data replication scans, etc. Some scan functions are continuously run, whereas other scan functions may be periodically run on demand to check for and fix particular types of errors. Likewise, some scan functions may be developed to implement recovery from failure, such as for disaster recovery or may be run in response to a suspected malware attack.

In some embodiments, the scan framework is configured to enable distributed scanning of work items globally across all cluster nodes of the storage system. Once a scan function is scheduled on a cluster node, the cluster node selects a work item to process and then scans the work item locally. The framework provides a coordination function to coordinate scan activities between cluster nodes, to ensure that when an instance of the scan function is scheduled to operate on a given cluster node, the cluster node will select a work item that has not previously been scanned by another cluster node.

In some embodiments, the scan framework distributes scan operations to all of the cluster nodes 116 of the storage system 100, thus taking advantage of the distributed computing resources of the storage system. However, the sheer size of the resources of the storage system can result in particular scan functions taking a very long amount of time. For example, a disk scan that looks for changed back-end tracks to implement front-end disaster recovery, can take over four days to complete. Further, some scans are dependent on each other, for example it may be necessary to implement a metadata scan before starting the disk scan, and the metadata scan itself may take on the order of 6 plus hours. In embodiments where the scan framework doesn't prioritize between work items of different scan functions, and which implements scan functions by sequentially scanning work items, it can take a significant amount of time to reach work items that are likely to contain errors. This can result in data of the storage system being temporarily unavailable and, in worst case scenarios, result in data loss.

According to some embodiments, a statistics and feedback-based scan framework for cluster nodes is provided, that prioritizes work items for processing by cluster nodes according to work item priority. In some embodiments, a heatmap of work items is created and used by the scan framework to prioritize work items for processing by the cluster nodes. The heatmap may be created from runtime IO operations, metadata access/updates, or other metrics derived from systems executing within the storage system. Additionally, as cluster nodes process allocated work items, the results of the scan operations are used to update the heat map to adjust the heat map based on the results of the previous scan operations. For example, in response to a determination by a cluster node that the scan operation on the work item resulted in no discernable error, the heatmap may be adjusted to lower the priority of work items in the vicinity of the work item that was scanned by the cluster node. By contrast, in response to a determination by a cluster node that the scan operation on the work item resulted in correction of one or more errors, the heatmap may be adjusted to increase the priority of work items in the vicinity of the work item that was scanned by the cluster node.

FIG. 2 is a block diagram of an example diagnostic scan framework 200 implementing a statistics and feedback-based scan framework for cluster nodes, according to some embodiments. As shown in FIG. 2, in some embodiments the diagnostic scan framework 200 includes a scan management interface 205, such as a Command Line Interface (CLI) and corresponding system calls (syscalls), that enables scan functions to be submitted to the scan framework for execution by the cluster nodes of the storage system. As noted above, numerous types of scan definitions may be created, each type of scan definition being created to evaluate different types of work items. An instance of the scan definition is submitted to the scan framework as a scan function to be implemented on the scan framework. The scan function may specify, for example, the type of work items to be scanned, and optionally a range of the type of work items to be scanned.

As shown in FIG. 2, in some embodiments the diagnostic scan framework 200 includes a scan tag table 210 in Global Memory (GM), that is used to store scan functions that have been submitted to the diagnostic scan framework 200 via the scan management interface 205. In some embodiments the scan tag table 210 of the diagnostic scan framework 200 has on the order of 256 slots, each slot being used to contain a particular scan function. However, the particular number of slots of the scan tag table 210 may depend on the particular implementation. Other ways of maintaining information regarding submitted scan functions may be utilized by the diagnostic scan framework 200 as well, depending on the implementation. Numerous scan functions based on the same scan definition may be submitted to the diagnostic scan framework 200 for execution on the diagnostic scan framework 200 simultaneously. Likewise, numerous scan functions based on the different scan definitions may be submitted to the diagnostic scan framework 200 for execution on the diagnostic scan framework 200 simultaneously.

Figure 3:
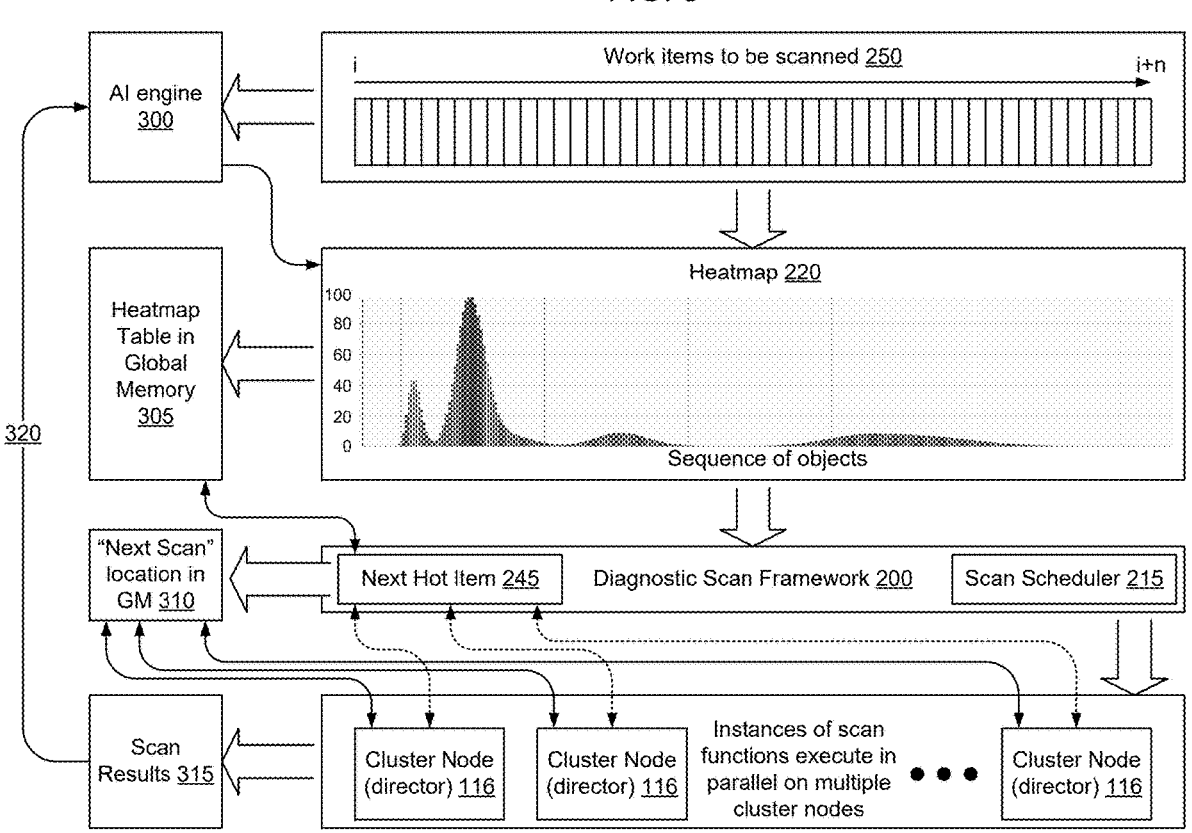
FIG. 3 is a block diagram of an example method of using the diagnostic scan framework of FIG. 2 to implement a diagnostic scan using a statistics and feedback-based prioritization of work items, in which work items are individually

As shown in FIG. 3, in some embodiments the diagnostic scan framework 200 includes a scan scheduler 215 configured to implement the scan functions 235 by scheduling instances 235 of the scan function (scan operations) to cluster nodes to cause the cluster nodes to execute the scan operations on one or more work items of the scan function.

In some embodiments, the diagnostic scan framework 200 is configured to enable work items of a particular scan function to be implemented sequentially, by scanning work items of the scan function sequentially within the storage system. To implement a sequential item scan, in some embodiments the diagnostic scan framework 200 includes a "next item" function. When a scan operation is scheduled to execute on a cluster node, the cluster node reads a "next scan" location 310 of global memory (GM) to identify a the work item of the scan function to be processed by the cluster node. The cluster node then calls the next item function 240 of the diagnostic scan framework 200, which causes the identity of the next work item to be loaded to the "next scan" location of global memory. Accordingly, when a subsequent scan operation is scheduled to execute on a next cluster node, the next cluster node will be able to read the identity of the next work item to be processed by reading the "next scan" location of global memory. This process iterates to cause the scan function to be sequentially implemented across a range of work items by a distributed set of scan operations on multiple cluster nodes.

As shown in FIG. 2, in some embodiments the diagnostic scan framework 200 also includes a next hot item function 245 that is configured to enable a particular scan function to be implemented such that the work items of the scan function are processed by scan operations in a non-sequential manner, by scanning work items of the scan function according to priority as reflected in a scan heatmap in global memory 220. To implement a statistics and feedback-based scan, in which work items are selected for processing in order of priority, in some embodiments the diagnostic scan framework 200 includes a "next hot item" function 245. When a scan operation is scheduled to execute on a cluster node, the cluster node reads a "next scan" location 310 of global memory (GM) to identify a the work item of the scan function to be scanned by the cluster node. The cluster node then calls the next hot item function 245 of the diagnostic scan framework 200. The next hot item function 245 accesses the heatmap 220 to identify the next work item, according to priority between the work items, and returns the identity of the next hottest work item. The identity of the next hottest work item is then loaded by the next hot item function 245 or by the cluster node to the "next scan" location of global memory. Accordingly, when a subsequent scan operation is scheduled to execute on a next cluster node, the next cluster node will be able to read the identity of the next work item to be processed by reading the "next scan" location of global memory. This process iterates to cause the scan function to be implemented in a non-sequential manner, by scanning work items of the scan function according to priority, until all work items of a range of work items defined by the scan function has been processed or until processing of the scan function on the diagnostic scan framework 200 is otherwise stopped.

As shown in FIG. 2, as cluster nodes implement scan operations on the work items, the results of the scan operations are reported in an area of global memory allocated for error collection 230. In some embodiments, the scan definition defines corrective actions that should be taken during the scan operations, for example by specifying remedial actions that the scan operations should implement in response to identification of an error in a scanned work item. The result of the scan operation, such as the location of the error, the type of error, and the remedial action that was implemented, may be reported in the error collection region 230 of global memory (GM). In some embodiments, the diagnostic scan framework 200 includes a scan error interface 225, such as a Command Line Interface (CLI) and associated system calls, that enables the information stored in the error collection region 230 of global memory to be accessed. The CLI 225, for example, may be used to retrieve results of the scan functions, filter the results, and otherwise process and display the results.

As shown in FIG. 2, in some embodiments the diagnostic scan framework 200 enables scan definitions to be defined that enable scan functions to scan on many types of work items. FIG. 2 shows several example work items, such as data devices (TDAT) 255, cache 260, logical volumes (thin devices) TDev 265, metadata 270, and numerous other 275 aspects of the storage system 100.

FIG. 3 is a block diagram of an example method of using the diagnostic scan framework of FIG. 2 to implement a diagnostic scan using a statistics and feedback-based prioritization of work items, in which work items are individually selected to be scanned by cluster nodes based on work item priority, according to some embodiments. As shown in FIG. 3, in some embodiments a scan function is submitted to the diagnostic scan framework 200. The scan function includes a range of work items to be scanned 250 which, in the illustrated embodiment are enumerated as encompassing a range from i to i+n. An AI engine 300, accessing information maintained by the storage system 100 such as activity-based statistics, runtime IO statistics, metadata access statistics, error location statistics, and other heatmaps generated and maintained on the storage system, assigns a priority value to each work item relative to all of the other work items to generate a heatmap 220. In FIG. 3, the heatmap has a range of values from 0 to 100, with higher numbers showing work items with higher priority. The work items are, accordingly, ranked from 100 (highest priority) to 0 (lowest priority).

As shown in FIG. 3, the diagnostic scan framework 200 includes scan scheduler 215 that assigns scan operations to cluster nodes. When a scan operation is assigned to a cluster node, the executing scan operation on the cluster node reads the identity of the work item to be processed from the "next scan" location in global memory (GM) 310. The executing scan operation then calls the "next hot item" function 245 which determines from the heatmap 220 the identity of the work item with the next highest priority, which causes the identity of that next highest priority work item to be stored in the "next scan" location of shared global memory. The executing scan operation then implements the scan on the identified work item and outputs the scan results 315. Since each executing scan operation uses the "next scan" location of global memory 310 to determine which work item should be processed, and then calls the next hot item function 245 to populate the identity of the next highest priority work item to be processed according to the priority of the work items, it is possible for multiple cluster nodes to independently process work items in priority order without requiring the cluster nodes to communicate with each other and without any additional coordination between the cluster nodes.

As shown in FIG. 3, in some embodiments the scan results 315 are used as feedback 320 to the AI engine 300 to enable the AI engine 300 to alter the content of the heatmap 220 to adjust priority values of work items of the scan function that have not yet been processed. For example, while processing work items according to priority, one of the cluster nodes may determine the occurrence of an error on a particular work item. In some embodiments, the determination of an error on a particular work item is used by the AI engine to increase priority values of work items in the vicinity of the just processed work item to cause neighboring work items to be prioritized for processing. In this manner, the content of the heatmap 220 may be adjusted by the AI engine 300 as the scan function is underway, to adjust relative priorities of the work items based on the determination of the locations of errors by the cluster nodes.

FIG. 4 is a flow chart of an example method of using the diagnostic scan framework of FIG. 2 to implement a diagnostic scan using a statistics and feedback-based prioritization of work items, in which work items are individually selected to be scanned by the cluster nodes based on work item priority, according to some embodiments. As shown in FIG. 4, in some embodiments the diagnostic scan framework 200 receives a scan function to be implemented on the scan framework 200. The scan function, in some embodiments, is based on a scan definition and includes a type of scan to be implemented and a range and type of work items to be scanned (block 400). In some instances, the range of work items may include all work items of the type that exist on the storage system. In other instances, the range of work items may include a subset, a contiguous range, a non-contiguous set, or other group of work items of the type that exist on the storage system.

Work items within the range of work items are prioritized relative to each other to specify an order in which the work items are to be scanned while executing the scan function (block 405). In some embodiments, this results in generation of a heatmap of the work items. In some embodiments, the heatmap is generated by an AI engine 300, based on one or more inputs. Example inputs to the AI engine 300, in some embodiments, include activity-based statistics 410 relating to activity of the work items, runtime IO statistics 415 relating to read and write operations on the work items, and metadata access statistics 420 related to the work items. Error location statistics 425 may also be input to the AI engine 300. For example, if an error was identified on the storage system, which caused submission of the scan function to the scan framework, the location of the previously identified error may be used by the AI engine 300 to prioritize work items associated with the error for processing. Likewise, work items adjacent the work item where the error was detected may similarly be prioritized for scanning. In some embodiments, the storage system is configured to create other AI-generated heatmaps 430 in other contexts, that are used by storage system to optimize other types of processes on IO operations in other contexts. In some embodiments, these other heatmaps such as activity based heatmaps, are reused by the AI engine 300 in the context of the diagnostic scan framework 200 to prioritize work items. As shown in FIG. 4, in some embodiments feedback from scan operations is also used by the AI engine 300 to adjust the relative priority of the remaining unprocessed work items, for example as errors are identified while processing previous work items.

After prioritizing the work items of the defined scan function, an identity of a highest priority work item is set to the "next scan" location of global memory 310 (block 440). The diagnostic scan framework 200 then schedules an instance of a scan operation to execute on one of the cluster nodes (block 445). The assigned cluster node reads the "next scan" location of global memory to obtain an identity of the work item to be processed during the scan operation (block 450). The cluster node implements the scan processes on the identified work item (block 455) and also calls the next hot item method 245 of the diagnostic scan framework 200 (block 460). Although FIG. 4 shows blocks 455 and 460 as being implemented sequentially, in some embodiments blocks 455 and 460 are implemented in parallel, or alternatively block 460 may be implemented before starting to implement the scan processes on the identified work item (block 460 may be implemented before block 455).

In some embodiments, the next hot item function 245 access the heatmap 220 to determine the identity of the next highest priority work item to be scanned. A determination is then made if the previous item was the last work item of the scan function (block 475). In response to a determination that the last work item was the last item (a determination of YES at block 745), the scan is compete and the result of the scan function is output, for example to the error collection location of global memory 230. In response to a determination that the previous work item was not the last work item included in the range of work items of the scan function (a determination of NO at block 745), the next scan location of global memory is updated to include the identity of the work item with the next highest priority to be scanned the next time an instance of the scan function (scan operation) is scheduled to execute on a cluster node.

In some embodiments, as shown in FIG. 4 with dashed line (arrow 1), when a cluster node implements the scan operation on the assigned work item, the cluster node provides feedback from the result of the scan operation to the AI engine 300 to enable the AI engine 300 to adjust the relative priority of the remaining items in the heatmap 220. Optionally, as shown in FIG. 4 with dashed line (arrow 2), when a cluster node implements the scan operation on the assigned work item, the cluster node also outputs the results of the scan operation to the error collection region of global memory 230 to enable partial scan results to become incrementally available as work items of the scan function are processed.

FIG. 5 is a block diagram of an example method of using the diagnostic scan framework of FIG. 2 to implement a diagnostic scan using a statistics and feedback-based prioritization of work items, in which work items are grouped into work item regions, and in which the work items regions are selected to be scanned according to region priority, according to some embodiments. In the example shown in FIG. 5, a scan function has been submitted to the diagnostic scan framework 200, in which the scan function includes a range of work items from i to i+n. An AI engine 300 prioritizes the work items according to priority, and using the work item priorities creates a regional heatmap 500, in which contiguous sets of work items are grouped into regions. The relative priority of each region is then determined relative to the other regions based on the priorities of the work items contained within each respective region. For example, the average priority value of the work items contained a given region may be calculated and used to rank the priority of the regions within the heatmap 500. Other ways of determining relative region priorities may be used as well, depending on the implementation.

The region priority is then used to schedule each region for processing on the scan framework, according to the priority of the region 505. In the example shown in FIG. 5, region 6 has been assigned the highest priority and, accordingly, region 6 has been scheduled to be scanned first. Region 7 has the next highest priority and, after all work items of region 6 have been scanned, region 7 will be selected by scan region scheduling 505 to be scanned. In some embodiments, within each region, work items are selected for processing in sequential order. In other embodiments, within each region, work items are selected for processing according to the priority values of the work items contained within the region. The scan results 315, in some embodiments, are used as feedback to the AI engine and used by the AI engine to adjust the relative priority of the remaining regions. By condensing the heatmap into a regional heatmap 500, and prioritizing regions of work items, it is possible to greatly reduce the amount of data that must be stored in global memory. For example, if there are millions of individual work items, maintaining a heatmap including the relative priority of each of the millions of work items will take up considerably more memory than dividing the work items into a small number of regions, such as 20 regions, and storing the relative priority of the 20 regions. Likewise, in instances where work items are selected for processing according to the priority values of the work items contained within the region, dividing the range of work items in regions enables only a portion of the heatmap to be serially loaded to global memory each time a new region is selected, thus still reducing overall use of global memory.

In some embodiments, once a region has been selected for processing, the work items are sequentially selected for processing using the next item function 240 to update the "next scan" location in shared global memory 310. After processing a region, a next region function is used to identify a subsequent region with the next highest priority, which is used for example to populate a next region location in shared global memory 510.

FIG. 6 is a flow chart of an example method of using the diagnostic scan framework of FIG. 2 to implement a diagnostic scan using a statistics and feedback-based prioritization of work items, in which work items are grouped into work item regions, and in which the work items regions are selected to be scanned according to region priority, according to some embodiments. As used herein, the term "regions" is a plural term and expressly includes two or more regions. The term "regions", as used herein, does not include creation of only a single region for a given scan function.

As shown in FIG. 6, in some embodiments the diagnostic scan framework 200 receives a scan function to be implemented on the scan framework 200. The scan function, in some embodiments, includes a type of scan to be implemented and a range of work items to be scanned (block 600). In some instances, the range of work items may include all work items of the type that exist on the storage system. In other instances, the range of work items may include a subset, a contiguous range, a non-contiguous set, or other group of work items of the type that exist on the storage system.

Work items within the range of work items are prioritized relative to each other. In some embodiments, this results in generation of a heatmap of the work items. In some embodiments, the heatmap is generated by an AI engine 300 based on multiple inputs. Example inputs to the AI engine 300 are described above in connection with FIG. 4. The AI engine uses the heatmap to define work item regions within the range of work items, and the work item regions are prioritized relative to each other based on the priority values of the work items contained in each region, to specify an order in which the work item regions are to be scanned (block 605). Work item regions defined by the AI may all contain the same number of work items, or the work item regions may contain different numbers of work items depending on the implementation.

The highest priority work item region is then selected (block 610) and the first work item in the selected work item region is set to the "next scan" location of global memory (block 615). The scan scheduler schedules one of the cluster nodes to execute an instance of the scan function (scan operation) (block 620), and the cluster node reads the "next scan" location of global memory to identify the work item to process (block 625). The cluster node implements the scan process on the identified work item (block 630) and updates the "next scan" location of global memory to the next subsequent work item within the selected work item region (block 635). In some embodiments, the "next item" function 240 of the diagnostic scan framework 200 is called by the cluster node to update the "next scan" location of global memory.

When the "next item" function 240 is called to update the "next scan" location of global memory 310, a determination is made as to whether the previous work item that has been assigned to the cluster node for processing is the last work item within the priority region (block 640). In response to a determination that the previous work item that was assigned to the cluster node for processing is not the last work item within the priority region (a determination of NO at block 640), the identity of the next subsequent work item is set to the "next scan" location of global memory 310. This process iterates by assigning work items to cluster nodes for scan processing, until the last work item of the priority region has been reached (a determination of YES at block 640).

Once all work items of a selected priority region have been processed (a determination of YES at block 640), a determination is made as to whether there are additional work item regions to be processed (block 645). In response to a determination that there are additional work item regions to be processed (a determination of YES at block 645), a next work item region is selected according to region priority, for example by selecting a region with the next highest priority from the regional heatmap 500 (block 650). The next highest priority region is then processed (blocks 615-640), and additional regions are selected according to priority (blocks 645, 650), until there are no additional work item regions to be processed (a determination of NO at block 645). The results of the scan operations are incrementally made available as work items are processed by the cluster nodes (arrow 4), or upon completion of the scan function (block 655). The results of the scan operations may also be used to adjust the relative priority of the priority regions in the regional heatmap 500 (arrow 3).

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated. The term "about" is used to indicate that a value includes the standard level of error for the device or method being employed to determine the value. The use of the term "or" in the claims is used to mean "and/or" unless explicitly indicated to refer to alternatives only or the alternatives are mutually exclusive, although the disclosure supports a definition that refers to only alternatives and to "and/or." The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of prioritizing processing of work items by cluster nodes to implement a scan function on a diagnostic scan framework, comprising:

receiving a scan function, the scan function identifying a type of scan to be implemented on the diagnostic scan framework and a range of work items to be scanned;

prioritizing each of the work items of the range of work items relative to each other to form a prioritized ranking of work items;

processing the work items of the scan function according to the prioritized ranking of the work items, wherein processing each work item comprises:

assigning a scan operation to be executed on a respective cluster node;

identifying, by the respective cluster node from the diagnostic scan framework, a highest priority work item of the scan function that has not yet been processed by another cluster node;

implementing a scan process on the identified highest priority work item by the respective cluster node; and updating the diagnostic scan framework to identify a next highest priority work item to be processed by a subsequent cluster node.

2. The method of claim 1, wherein processing the work items of the scan function according to the prioritized ranking of work items comprises individually selecting each of the work items of the scan function to be scanned by cluster nodes based on work item priority.

3. The method of claim 1, wherein processing the work items of the scan function according to the prioritized ranking of work items comprises:

grouping sets of work items into work item regions;

prioritizing each of the work item regions of the range of work items relative to each other to form a prioritized ranking of work item regions; and processing work items according to the prioritization of the work item regions.

4. The method of claim 3, wherein processing work items according to the prioritization of the work item regions comprises:

selecting a highest priority work item region;

processing all work items of the selected highest priority work item region;

selecting a next highest priority work item region;

processing all work items of the selected next highest priority work item region; and iterating the steps of selecting the next highest priority work item region and processing all work items of the selected next highest priority work item region until all work items of all work item regions have been processed.

5. The method of claim 4, wherein processing work items of a selected work item region comprises sequentially selecting each of the work items of the selected work item region to be scanned by cluster nodes.

6. The method of claim 4, wherein processing all work items of a selected work item region comprises selecting each of the work items of the selected work item region to be scanned by cluster nodes based on relative priorities of the work items of the selected work item region from highest priority to lowest priority.

7. The method of claim 1, wherein prioritizing each of the work items of the range of work items relative to each other to form a prioritized ranking of work items comprises creating a workload item heatmap.

8. The method of claim 1, wherein implementing a scan process on the identified highest priority work item by the respective cluster node comprises determining whether work item contained an error.

9. The method of claim 8, in response to a determination by the respective cluster node that the scan process on the work item resulted in no discernable error, adjusting the prioritized ranking of work items to lower a priority of work items adjacent the work item that was scanned by the respective cluster node.

10. The method of claim 8, in response to a determination by the respective cluster node that the scan process on the work item resulted in correction of one or more errors, adjusting the prioritized ranking of work items to increase a priority of work items adjacent the work item that was scanned by the respective cluster node.

11. A diagnostic scan framework for prioritizing processing of work items by cluster nodes to implement a scan function, comprising:

one or more processors and one or more storage devices storing instructions that are configured, when executed by the one or more processors, to cause the one or more processors to perform operations comprising:

receiving a scan function, the scan function identifying a type of scan to be implemented on the diagnostic scan framework and a range of work items to be scanned;

prioritizing each of the work items of the range of work items relative to each other to form a prioritized ranking of work items;

processing the work items of the scan function according to the prioritized ranking of the work items, wherein processing each work item comprises:

assigning a scan operation to be executed on a respective cluster node;

identifying, by the respective cluster node from the diagnostic scan framework, a highest priority work item of the scan function that has not yet been processed by another cluster node;

implementing a scan process on the identified highest priority work item by the respective cluster node; and updating the diagnostic scan framework to identify a next highest priority work item to be processed by a subsequent cluster node.

12. The diagnostic scan framework of claim 11, wherein processing the work items of the scan function according to the prioritized ranking of work items comprises individually selecting each of the work items of the scan function to be scanned by cluster nodes based on work item priority.

13. The diagnostic scan framework of claim 11, wherein processing the work items of the scan function according to the prioritized ranking of work items comprises:

grouping sets of work items into work item regions;

prioritizing each of the work item regions of the range of work items relative to each other to form a prioritized ranking of work item regions; and processing work items according to the prioritization of the work item regions.

14. The diagnostic scan framework of claim 13, wherein processing work items according to the prioritization of the work item regions comprises:

selecting a highest priority work item region;

processing all work items of the selected highest priority work item region;

selecting a next highest priority work item region;

processing all work items of the selected next highest priority work item region; and iterating the steps of selecting the next highest priority work item region and processing all work items of the selected next highest priority work item region until all work items of all work item regions have been processed.

15. The diagnostic scan framework of claim 14, wherein processing work items of a selected work item region comprises sequentially selecting each of the work items of the selected work item region to be scanned by cluster nodes.

16. The diagnostic scan framework of claim 14, wherein processing all work items of a selected work item region comprises selecting each of the work items of the selected work item region to be scanned by cluster nodes based on relative priorities of the work items of the selected work item region from highest priority to lowest priority.

17. The diagnostic scan framework of claim 11, wherein prioritizing each of the work items of the range of work items relative to each other to form a prioritized ranking of work items comprises creating a workload item heatmap.

18. The diagnostic scan framework of claim 11, wherein implementing a scan process on the identified highest priority work item by the respective cluster node comprises determining whether work item contained an error.

19. The diagnostic scan framework of claim 18, in response to a determination by the respective cluster node that the scan process on the work item resulted in no discernable error, adjusting the prioritized ranking of work items to lower a priority of work items adjacent the work item that was scanned by the respective cluster node.

20. The diagnostic scan framework of claim 18, in response to a determination by the respective cluster node that the scan process on the work item resulted in correction of one or more errors, adjusting the prioritized ranking of work items to increase a priority of work items adjacent the work item that was scanned by the respective cluster node.

\* \* \* \* \*